(12) United States Patent
Mosebach et al.

(10) Patent No.: US 11,927,966 B2
(45) Date of Patent: Mar. 12, 2024

(54) AUTOMATICALLY MOVING FLOOR TREATMENT APPLIANCE COMPRISING AT LEAST ONE FALL SENSOR

(71) Applicant: Vorwerk & Co. Interholding GmbH, Wuppertal (DE)

(72) Inventors: Andrej Mosebach, Unna (DE); Henning Hayn, Hilden (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 303 days.

(21) Appl. No.: 17/537,814

(22) Filed: Nov. 30, 2021

(65) Prior Publication Data
US 2022/0179426 A1 Jun. 9, 2022

(30) Foreign Application Priority Data
Dec. 3, 2020 (DE) ...................... 10 2020 132 205.4

(51) Int. Cl.
*G05D 1/02* (2020.01)
*G05D 1/00* (2006.01)
*G07C 5/08* (2006.01)

(52) U.S. Cl.
CPC ......... *G05D 1/0214* (2013.01); *G07C 5/0808* (2013.01); *G05D 2201/0203* (2013.01)

(58) Field of Classification Search
CPC ................. G05D 1/0214; G05D 1/02; G05D 2201/0203; G07C 5/0808; G07C 5/08; A47L 9/28
See application file for complete search history.

(56) References Cited

U.S. PATENT DOCUMENTS

| 6,370,453 | B2* | 4/2002 | Sommer | A47L 11/4044 |
| | | | | 701/25 |
| 2014/0107838 | A1* | 4/2014 | Ko | G05D 1/0234 |
| | | | | 700/245 |
| 2015/0134144 | A1* | 5/2015 | Bron | G05D 1/0234 |
| | | | | 701/2 |
| 2015/0205299 | A1* | 7/2015 | Schnittman | G05D 1/0227 |
| | | | | 901/1 |

* cited by examiner

*Primary Examiner* — Tan Q Nguyen
(74) *Attorney, Agent, or Firm* — Collard & Roe, P.C.

(57) ABSTRACT

An automatically moving floor treatment appliance has an appliance housing, a drive, a computing element and a plurality of fall sensors. The computing element compares a detection result of a fall sensor with a known reference result, and when the detection result does not correspond with the reference result, determines a malfunctioning of the fall sensor. The computing element determines distances detected chronologically successively by the same fall sensor during a movement of the appliance with one another, and when the distances are identical, determines a malfunctioning of the fall sensor, and/or compares a detection result of the leading fall sensor with a detection result of a trailing fall sensor and when the trailing fall sensor detects a slope without the leading fall sensor having detected the slope before, determines a malfunctioning of the leading fall sensor and the trailing fall sensor takes over the from the leading fall sensor.

9 Claims, 3 Drawing Sheets

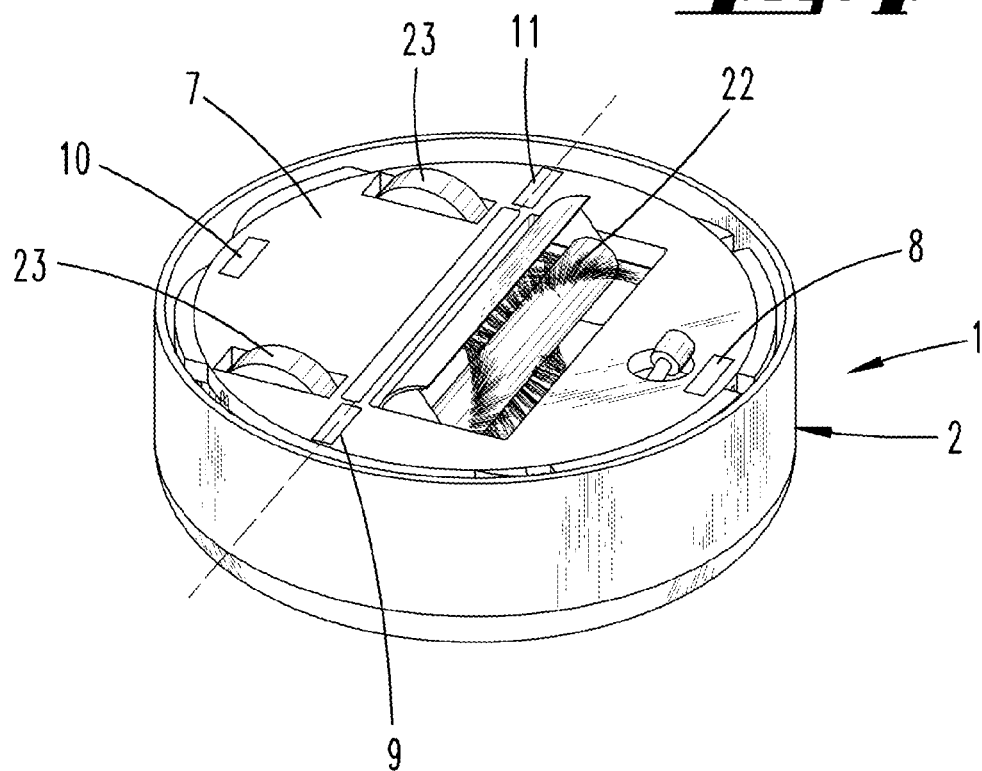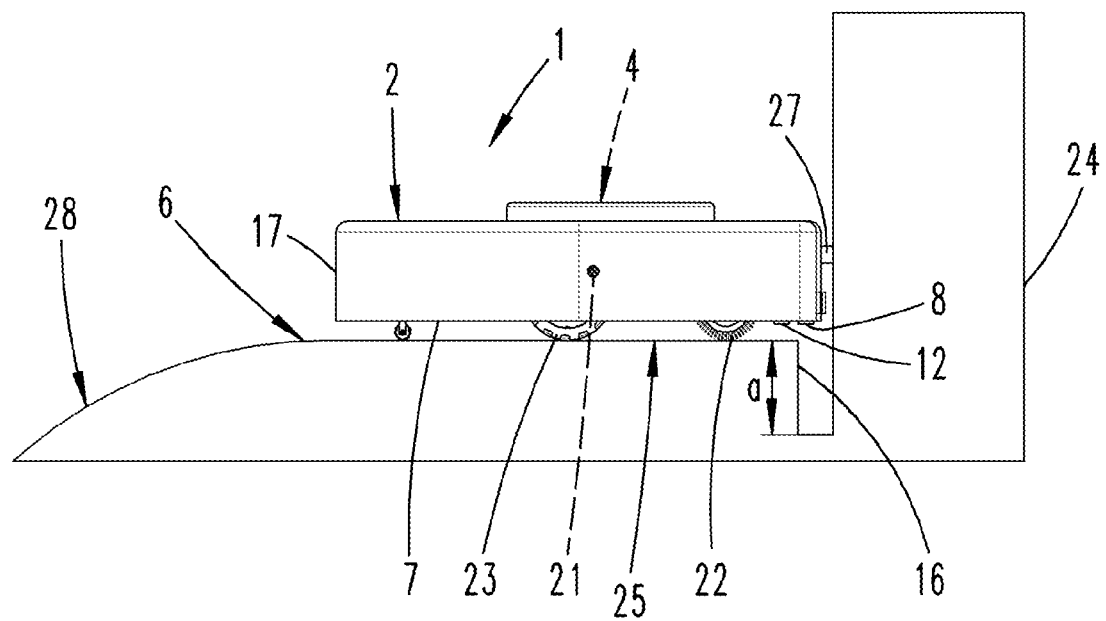

AUTOMATICALLY MOVING FLOOR TREATMENT APPLIANCE COMPRISING AT LEAST ONE FALL SENSOR

CROSS REFERENCE TO RELATED APPLICATIONS

Applicant claims priority under 35 U.S.C. § 119 of German Application No. 10 2020 132 205.4 filed Dec. 3, 2020, the disclosure of which is incorporated by reference.

BACKGROUND OF THE INVENTION

1. Field of the Invention

The invention relates to an automatically moving floor treatment appliance comprising an appliance housing, a drive means for the movement of the floor treatment appliance within a surrounding area, at least one fall sensor arranged on an underside of the appliance housing facing a surface, which is configured to detect a distance of the floor treatment appliance from the surface, and a computing means, which is configured to compare the distance detected by means of the fall sensor with a threshold value defining a slope and, in the event that the detected distance is greater than the defined threshold value, to determine the presence of a slope as detection result, and to transmit a control command for changing a movement of the floor treatment appliance to the drive means.

2. Description of the Related Art

Automatically moving floor treatment appliances are known in the prior art in various embodiments.

The floor treatment appliances are, for example, conventional household appliances or industrially used appliances, which perform a floor treatment activity, such as for example, vacuuming, mopping, polishing, sanding, oiling, or also combinations thereof. According to an embodiment, the automatically moving floor treatment appliance can be, for example, a robot vacuum cleaner, robot mop, or the like. So that the floor treatment appliance does not collide with obstacles, it has a detection means, which can recognize obstacles, such as, for examples, walls, pieces of furniture, decorative objects, or the like, in the surrounding area. The detection means can be, for example, a distance measuring means, which measures distances from obstacles. In the alternative or in addition, the detection means can also have contact sensors, which can detect a contact to an obstacle. The detection means can have a plurality of different sensors, which utilize various technologies to detect the surrounding area features. Common detection means have, for example, laser distance sensors, in particular triangulation sensors, ultrasonic sensors, radar sensors, or the like.

In the case of more highly developed appliances, it is furthermore known that the surrounding area features detected by the detection means are used to generate a surrounding area map, which shows a layout of the surrounding area of the floor treatment appliance and in which the positions of obstacles are noted. Based on the generated surrounding area map, the computing means can determine a current position of the floor treatment appliance in the surrounding area and can optionally plan a movement route through the surrounding area. It is furthermore known that the detection means of the floor treatment appliance also has one or several fall sensors, which measures a distance from a surface and thus optionally detects that the floor treatment appliance moves towards a slope. Such a slope can be, for example, a flight of stairs, an edge region of a step, of a landing, or the like. When the floor treatment appliance moves towards such a slope, the fall sensor, which is arranged on the underside of the appliance housing, reaches beyond the slope and detects the changed, namely, increased distance, from the surface of the floor treatment appliance, namely, for example, the top side of a next step. The computing means of the floor treatment appliance then recognizes the slope and can prompt the floor treatment appliance to perform a change in direction, and can thus prevent the floor treatment appliance from falling down the slope. The floor treatment appliance thus turns at the outer edge of the slope or travels parallel thereto, respectively, and continues its movement. At several positions of its appliance housing, the floor treatment appliance usually has such fall sensors, in order to provide a protection against a fall of the floor treatment appliance in the case of different directions of movement.

Even though the fall sensors have proven themselves in the prior art, there is nonetheless generally the danger that a fall sensor is defective and can no longer detect that the floor treatment appliance approaches a slope. In this case, it could happen that the floor treatment appliance falls down a slope and thereby causes damages or even represents a danger to persons.

SUMMARY OF THE INVENTION

Based on the above-mentioned prior art, it is the object of the invention to create an automatically moving floor treatment appliance, in the case of which malfunctions of the fall sensor can be reliably detected.

To solve the above-mentioned object, it is proposed that, on the underside of the appliance housing, the floor treatment appliance has a plurality of fall sensors, which are arranged one behind the other in the direction of a circumferential contour of the underside, wherein the computing means is configured to compare a detection result of a fall sensor with a known reference result, and, in the event that the detection result does not correspond with the reference result, to determine a malfunctioning of the leading fall sensor, wherein the computing means is configured to compare distances determined chronologically successively by the same fall sensor during a movement of the floor treatment appliance with one another, and, in the event that the distances are identical, to determine a malfunctioning of the fall sensor, and/or wherein the computing means is configured to compare a detection result of a fall sensor with a detection result of at least one further fall sensor trailing the fall sensor in the direction of movement, and, in the event that the trailing fall sensor detects a slope without the leading fall sensor having detected the slope before, to determine a malfunctioning of the leading fall sensor, wherein the floor treatment appliance is initially further operated, under the condition that the trailing fall sensor now takes over the securing function of the defective leading fall sensor.

According to the invention, the computing means is thus formed to verify the detection result determined by a fall sensor, namely the result as to whether or not a slope exists in the region of the floor treatment appliance. The verification thereby takes place by means of a comparison of the detection result with a known reference result or with a detection result from another fall sensor, which trails the fall sensor to be checked, i.e. which reaches into the region of the slope later in time. In the latter case, the detection result of the trailing fall sensor thus serves as reference result. This is based on the knowledge that a slope of the surface initially reaches into the detection region of a leading fall sensor of the floor treatment appliance, namely of a fall sensor, which is arranged further on the outside on the underside of the appliance housing, and only then—during continued movement of the floor treatment appliance in the same direction of movement—into the detection region of the trailing fall sensor, which is arranged further on the inside on the underside of the appliance housing. Provided that both fall sensors, i.e. the leading as well as the trailing fall sensor, work properly, the leading fall sensor initially detects the slope, and then the trailing fall sensor. Provided that the leading fall sensor is defective, however, the slope is only detected by the trailing fall sensor, and a conclusion can be drawn that the leading fall sensor is obviously defective. The functionality of a fall sensor can furthermore also be checked when the floor treatment appliance has only this one fall sensor. In this case, the detection result of the fall sensor, which is determined by means of the computing means, is compared with a defined reference result. This can take place, for example, in that the floor treatment appliance travels to a known subregion of the surrounding area, where a slope exists. This slope can then be used to verify the functionality of the fall sensor. Provided that the floor treatment appliance moves across the slope with that subregion of the underside of the appliance housing, which carries the fall sensor, the functional fall sensor has to detect the slope. If this is not the case, a conclusion can be drawn that the fall sensor is obviously defective. According to a further embodiment, the computing means of the floor treatment appliance can be formed to combine both above-mentioned verification alternatives with one another, namely to compare the detection result of a fall sensor with a static reference result as well as with a detection result of another fall sensor, which trails the fall sensor, which is to be checked. A maximally high safety when using the floor treatment appliance can thus be ensured. A deviation of the detection result of a fall sensor from plausible detection results can be reliably determined.

Various types of malfunctions of the fall sensor can be determined by means of the invention. This includes sensor errors, in the case of which the fall sensor continuously measures a minimal or maximal distance from a surface. In the case of an error, the fall sensor can furthermore also continuously display a constant value between a minimal and a maximal distance. The evaluation can thereby in each case take place so that the computing means compares a distance value detected by a first fall sensor with a distance value detected at the same location by a second fall sensor, in that a difference of the two detection signals is determined. Provided that the difference does not equal zero or lies at least above a tolerable threshold value, a conclusion can be drawn to an error of the first or second fall sensor, depending on which distance value is more plausible as a function of a current operating type or of current whereabouts of the floor treatment appliance.

It is furthermore proposed that the underside of the appliance housing has at least four fall sensors, which, based on a geometrical center of the underside, are located opposite one another essentially in pairs, so that at least one fall sensor is assigned to each one of four sides of the circumferential contour. In the case of this design, the floor treatment appliance is secured against a fall from all sides, if possible. In the case of an essentially square appliance housing, a fall sensor can be assigned to each side of the circumferential contour. In the case of an essentially round appliance housing, each circumferential subsection, which draws an angular range of 90 degrees, can have a fall sensor. Based on the geometrical center, the fall sensors can be arranged symmetrically or also asymmetrically. It is essential that a fall sensor is assigned to each side. In the case of an imaginary straight connecting line, which connects a fall sensor to the geometrical center, a crosswise arrangement of the fall sensors is essentially created in the case of this embodiment. A floor treatment appliance formed in this way can advantageously be secured against a fall, in that the signals of two fall sensors, which are located opposite one another based on the geometrical center, are compared with a signal of a fall sensor leading the straight connecting line in the direction of movement. If both of the two fall sensors located opposite one another detect a slope approximately at the same time, the further fall sensor, which is located upstream in the direction of movement, has to inevitable also have detected a slope before. If this is not the case, the computing means of the floor treatment appliance can draw a conclusion that the upstream fall sensor is defective. Depending on a current direction of movement of the floor treatment appliance, at least the detection results of those fall sensors, which are located closest to a leading subregion of the circumferential contour in the direction of travel, are compared with one another. It is thereby recommended in each case to form comparison pairs from two fall sensors, the imaginary straight connecting line of which lies transversely to the current direction of movement of the floor treatment appliance. The signal of a further fall sensor leading the straight connecting line can additionally be compared with the signals of the fall sensors of the straight connecting line, because, when functioning properly, the leading fall sensor detects a slope before the following fall sensors can detect the slope. The floor treatment appliance can additionally not only have four fall sensors, but also five or more. Particularly preferably, the number of the fall sensors installed on the underside of the appliance housing can be divided by two, so that pairs of fall sensors can in each case be formed, which follow a symmetry of the arrangement of fall sensors.

It can be provided that, on the underside of the appliance housing, the floor treatment appliance has a plurality of outer fall sensors, which are arranged one behind the other in the direction of a circumferential contour of the underside, and a plurality of inner fall sensors, which, based on the circumferential contour and relative to the outer fall sensors, are offset inwards, wherein the computing means is configured to compare a detection result of an outer fall sensor with a detection result of an inner fall sensor, which is locally assigned to the outer fall sensor, and, in the event that the inner fall sensor detects a slope and the assigned outer fall sensor does not detect a slope, to determine a malfunctioning of the outer fall sensor. In the case of this design, the inner fall sensors represent a redundant sensor system for securing the floor treatment appliance against a fall at a slope. The fall sensors are arranged in two loops along the circumferential contour, wherein an outer loop lies closer to the circumferential contour than an inner loop. The outer loop has the outer fall sensors, while the inner loop has the inner fall sensors. An inner fall sensor is preferably in each case located in the vicinity of an outer fall sensor. Based on the circumferential direction of the appliance housing, the inner fall sensor can thereby be slightly offset to the outer fall sensor. It is essential that no distance, which is excessive for the functioning of the fall protection, exists between the outer fall sensor and the inner fall sensor, so that the floor treatment appliance does not cover a significant distance during a movement, until the inner fall sensor can detect the slope. This is the only way to ensure that a detection of the slope takes place by means of the inner fall sensor within a short period of time in response to a malfunctioning of the outer fall sensor.

In this context, it is preferably proposed that, based on a position on the underside of the appliance housing, an inner fall sensor is in each case spatially assigned to an outer fall sensor, so that the inner fall sensor and the outer fall sensor form a sensor pair. An outer fall sensor is thus in each case secured by means of an inner fall sensor, which can measure the danger of falling representative for a defective outer fall sensor. The inner fall sensor furthermore makes it possible to check the functionality of the outer fall sensor by means of signal comparison.

It can furthermore be provided that the inner fall sensors are arranged on the underside of the appliance housing so that a straight connecting line between two inner fall sensors, which are adjacent in the circumferential direction of the circumferential contour, does not intersect, in particular also does not affect, a center of gravity region defined on the underside, which has a vertical projection of the center of mass of the floor treatment appliance into the plane of the fall sensors. According to this design, the inner fall sensors and thus also the outer fall sensors are arranged around a vertical projection of the center of mass into the sensor plane so that straight connecting lines between fall sensors, which in each case follow one another in the circumferential direction, do not touch the defined center of gravity region. Based on the vertical projection of the center of mass, the center of gravity region is defined so that a fall of the floor treatment appliance at a slope is likely when a fall edge penetrates into the defined center of gravity region, i.e. lies vertically below the latter. An impending fall situation is thus recognized in time when the slope is detected, as long as the center of gravity region is not yet located above the outer edge of the slope. Based on a viewing direction onto the floor treatment appliance, in the case of which the observer looks vertically from the top onto the floor treatment appliance standing on the surface, the center of mass of the floor treatment appliance lies within the defined center of gravity region. When the inner fall sensors are arranged on the appliance housing outside of the defined center of gravity region so that an imaginary straight connecting line between adjacent fall sensors does not intersect the center of gravity or is additionally also does not affect it, the floor treatment appliance cannot fall over a slope. On the contrary, an outer edge of the slope would first reach into the detection region of an inner fall sensor before the center of mass of the floor treatment appliance lies relative to the slope so that the floor treatment appliance would lose its balance. The defined center of gravity region can thus also be identified as fall region, in which the presence of an outer edge of a slope would likely lead to a tilting of the floor treatment appliance.

It can furthermore be provided that the computing means is configured to compare distances determined chronologically successively by the same fall sensor during a movement of the floor treatment appliance with one another, and, in the event that the distances are identical, to determine a malfunctioning of the fall sensor. The detection signal of a fall sensor is thus compared with a reference result, which is a detection signal of the same fall sensor at an earlier point in time. In the case of this embodiment, it is not required to use an additional fall sensor, which is redundant to the fall sensor to be checked. Instead, chronologically successive detection signals of the same fall sensor are compared with one another, namely detected distance values from a surface of the floor treatment appliance. Provided that the floor treatment appliance moves relative to the surface, a slight change of the measured distance value has to take place solely due to a measurement technology-related noise of the fall sensors. Provided that such a variation cannot be detected, a conclusion is to be drawn that a sensor error is at hand. It is in particular recommended in this context that the computing means knows a threshold value for the noise of the fall sensor, so that the noise can be differentiated from an actual existence of a slope.

The computing means can furthermore be configured to stop the movement of the floor treatment appliance and/or to transmit an error signal to a user of the floor treatment appliance when a malfunctioning of the fall sensor is determined. In the event of a malfunctioning, a safety measure of the floor treatment appliance thus takes effect, and the computing means stops the drive means of the floor treatment appliance according to a possible course of action, thus resulting in a standstill. A safety shutdown of the floor treatment appliance or at least a safety shutdown of the drive means, respectively thus takes place, so that a fall of the floor treatment appliance at the slope is prevented. In the alternative or in addition, it can be provided that the computing means is configured to transmit an error signal to a user of the floor treatment appliance when a malfunctioning of a fall sensor is detected. In the alternative or in addition, the computing means can thus report an error case to a user of the floor treatment appliance, instead of or in addition to the stopping of the movement of the floor treatment appliance. In the alternative, however, it is also possible that the floor treatment appliance is initially further operated, under the condition that another fall sensor now takes over the securing function of the defective fall sensor. An error signal, i.e. the information relating to the error of the fall sensor system, can then inform the user that the floor treatment appliance is to be checked by a specialized company with regard to the functional safety. The error signal can be reported to the user in the form of acoustic or optical information. For example, the floor treatment appliance can have a loudspeaker or a display, which outputs the error, which occurred, in speech or text form. It is furthermore also possible that the floor treatment appliance has a communication interface, which transmits the error signal to an external end device of the user, which is in communication with the floor treatment appliance. For example, the external end device can be a mobile telephone, a tablet computer, or another mobile or stationary device of the user, which is suitable to receive the error signal and to bring it to the attention of the user. It is in particular proposed that the external end device of the user has an application, which is optimized for the communication with the floor treatment appliance, in particular the computing means thereof. The user can, for example, also transmit control commands to the computing means of the floor treatment appliance via the application.

In addition to the above-described floor treatment appliance, the invention furthermore also proposes a system of an automatically moving floor treatment appliance of the above-described type, and a base station for performing a service activity at the floor treatment appliance, wherein the base station has a reference surface, on which the floor treatment appliance can travel, and wherein the computing means of the floor treatment appliance is configured to compare a distance from the reference surface detected by a fall sensor of the floor treatment appliance with a defined reference result, and, in the event of a deviation, to determine a malfunctioning of the fall sensor. According to this design, the base section has a reference surface, at which the floor treatment appliance can check the functionality of the fall sensors. The distance of a fall sensor of the floor treatment appliance in a certain position and orientation of the floor treatment appliance at the base station to the reference surface is known to the computing means. In the case of this design, it is not required that the floor treatment appliance has several fall sensors, in order to check the plausibility of a detection result of a fall sensor. On the contrary, the reference surface of the base station serves as reference result. The base station can be, for example, a charging station for an accumulator of the floor treatment appliance or also a station for performing one or several further service activities at the floor treatment appliance or the components thereof, respectively. The reference surface of the base station can be, for example, a parking area, on which the floor treatment appliance positions itself, for example in order to charge an accumulator at the base station. In this defined position, a distance between the respective fall sensor and the reference surface is then known. A checking of the functionality of the fall sensors can then be performed during the service activity by comparing the distance detected by the fall sensor of the floor treatment appliance with a known reference distance from the reference surface. When the distance value detected by the fall sensor deviates from the defined reference value, a conclusion can be drawn to an error state of the fall sensor. A threshold value can optionally be defined, which determines when a deviation is classified as being relevant.

It can in particular be provided that the reference surface has a slope, wherein the slope is positioned so that the fall sensor of the floor treatment appliance displaces beyond the slope when traveling onto the reference surface. According to this design, the reference surface has a slope, at which the functionality of the fall sensor can be checked. The reference means has information about the height of the slope, so that the distance measured by the fall sensor at the slope can be compared with this reference value. The reference surface is preferably designed so that the floor treatment appliance can be displaced over the slope with a subregion of the appliance housing having one or several fall sensors. For example, a subregion of the reference surface serving as support surface for the floor treatment appliance can have a length and/or width, which is greater than a distance of two wheels of the floor treatment appliance arranged one behind the other or next to one another, respectively, in the direction of travel, but which is less than the outer contour of the appliance housing of the floor treatment appliance, so that that subregion of the underside of the appliance housing, at which a fall sensor is arranged or several fall sensors are arranged, protrudes over the slope. Particularly preferably, the position of the floor treatment appliance for checking the sensor function then corresponds with a position and orientation of the floor treatment appliance, which the floor treatment appliance already assumes when receiving a service activity, for example a docking position for recharging an accumulator of the floor treatment appliance.

Lastly, the invention also proposes a method for checking the functionality of a fall sensor of an automatically moving floor treatment appliance, wherein the floor treatment appliance has an appliance housing, a drive means for the movement of the floor treatment appliance within a surrounding area, at least one fall sensor arranged on an underside of the appliance housing facing a surface, and a computing means, wherein the fall sensor detects a distance of the floor treatment appliance from the surface, and wherein the computing means compares the distance detected by the fall sensor with a threshold value defining a slope and, in the event that the distance is greater than the defined threshold value, determines the presence of a slope as detection result, and transmits a control command for changing a movement of the floor treatment appliance to the drive means. According to the invention, it is provided that, on the underside of the appliance housing, the floor treatment appliance has a plurality of fall sensors, which are arranged one behind the other in the direction of a circumferential contour of the underside, wherein the computing means compares a detection result of a fall sensor with a defined reference result, and, in the event that the detection result does not correspond with the reference result, determines a malfunctioning of the leading fall sensor, wherein the computing means compares distances detected chronologically successively by the same fall sensor during a movement of the floor treatment appliance with one another, and, in the event that the distances are identical, determines a malfunctioning of the fall sensor, and/or wherein the computing means compares a detection result of a fall sensor with a detection result of at least one further fall sensor trailing the fall sensor in the direction of movement, and, in the event that the trailing fall sensor detects a slope without the leading fall sensor having detected the slope before, determines a malfunctioning of the leading fall sensor, wherein the floor treatment appliance is initially further operated, under the condition that the trailing fall sensor now takes over the securing function of the defective leading fall sensor. The proposed method is preferably a method for operating an automatically moving floor treatment appliance according to the above-described type. To avoid repetitions, reference is made to the above description of the floor treatment appliance with reference to the method. The features and advantages therefore also apply for the method according to the invention.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 4 shows a bottom view of a floor treatment appliance according to a further embodiment; and FIG. 5 shows the floor treatment appliance according to FIG. 4 at a base station.

DETAILED DESCRIPTION OF PREFERRED EMBODIMENTS

Figure 1:
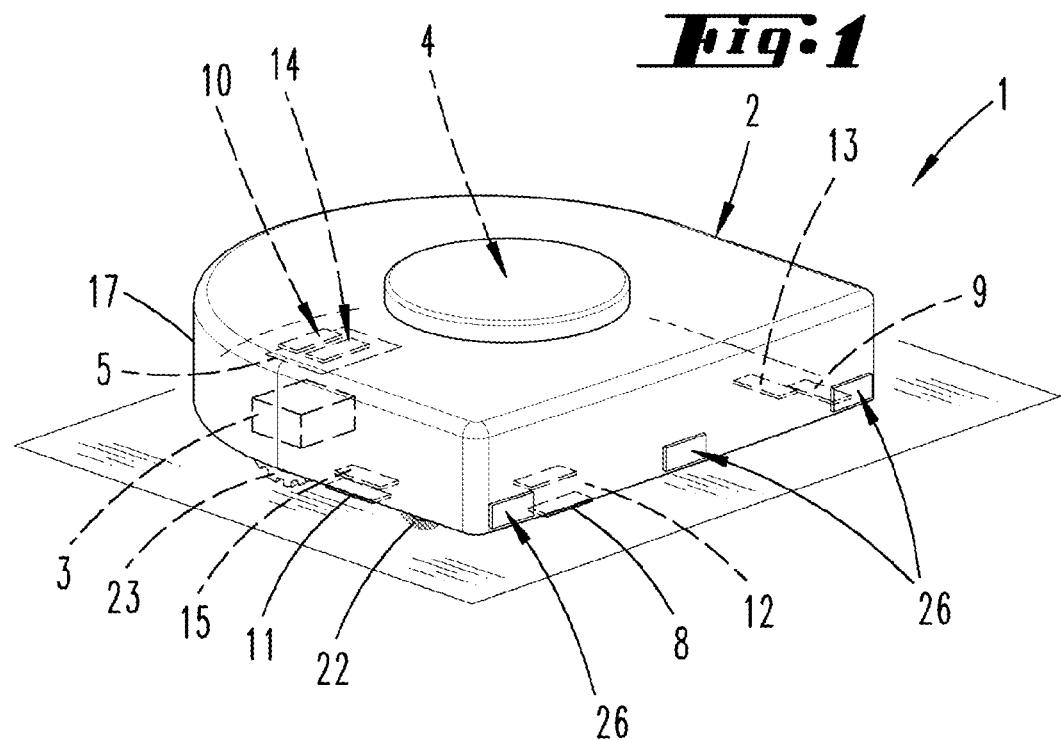
FIG. 1 shows a floor treatment appliance according to the invention according to a first embodiment.

FIG. 1 shows a floor treatment appliance 1 according to the invention in an exemplary manner, which is formed here as automatically moving robot cleaner. The floor treatment appliance 1 has an appliance housing 2 and a drive means 3, which serves to drive wheels 23 arranged on an underside 7 of the appliance housing 2. The floor treatment appliance 1 has a non-illustrated accumulator, which serves for an energy supply for the drive means 3 as well as for further electrical consumers of the floor treatment appliance 1. Here, the drive means 3 has, for example, an electric motor, which is not illustrated in more detail. A cleaning element 22, which is formed here as rotating bristle roller, is furthermore movably supported on the appliance housing 2. The floor treatment appliance 1 can furthermore have a blower (not illustrated), in order to be able to transfer, for example, suction material into a suction material collecting container. Alternatively to the formation as vacuum cleaning appliance, however, the floor treatment appliance 1 can also be formed as any other automatically moving floor treatment appliance 1, for example as mopping appliance, polishing appliance, or the like.

So that the floor treatment appliance 1 can move on a surface 6 without collision with obstacles, the floor treatment appliance 1 has a detection means 4 as well as collision sensors 26, and a computing means 5, which is formed to evaluate the signals detected by the detection means 4 and the collision sensors 26. Here, the detection means 4 is, for example, a distance measuring means, which measures distances from obstacles, which are present in the surrounding area. Here, the distance measuring means is formed, for example, as laser distance measuring means, in particular triangulation means, comprising a 360° light exit opening, which is arranged on the top side of the appliance housing 2. The distance values detected by the distance measuring means are used by the computing means 5 in order to generate a surrounding area map, which, in addition to a layout of the surrounding area, for example a room or an apartment, additionally also includes positions and dimensions of obstacles, which are present in the room or the apartment, respectively. The computing means 5 of the floor treatment appliance 1 uses the generated surrounding area map for the navigation and self-localization within the surrounding area. In particular a current position and orientation of the floor treatment appliance 1 can be determined, and, for example, a traveling route through the surrounding area can be planned, which is free from obstacles. The collision sensors 26 are formed, for example, as infrared sensors and serve to detect obstacles in a near region and thus also to avoid collisions. The floor treatment appliance 1 furthermore has fall sensors 8, 9, 10, 11, 12, 13, 14, 15, which can detect a slope 16 on a surface 6. For this purpose, the fall sensors 8, 9, 10, 11, 12, 13, 14, 15 detect a distance a, which specifies a height change of the surface 6. The computing means 5 evaluates the detected distance a, in that the computing means 5 evaluates the distance a by means of a comparison with a defined threshold value. Provided that the detected distance a is greater than the defined threshold value, a conclusion is drawn that the floor treatment appliance 1 is located at a slope 16 of the surface 6. To protect the floor treatment appliance 1 against falling over the slope 16 from all directions and thus also in any directions of movement, the fall sensors 8, 9, 10, 11, 12, 13, 14, 15 are arranged along a circumferential contour 17 of the underside 7 of the appliance housing 2.

Figure 2:
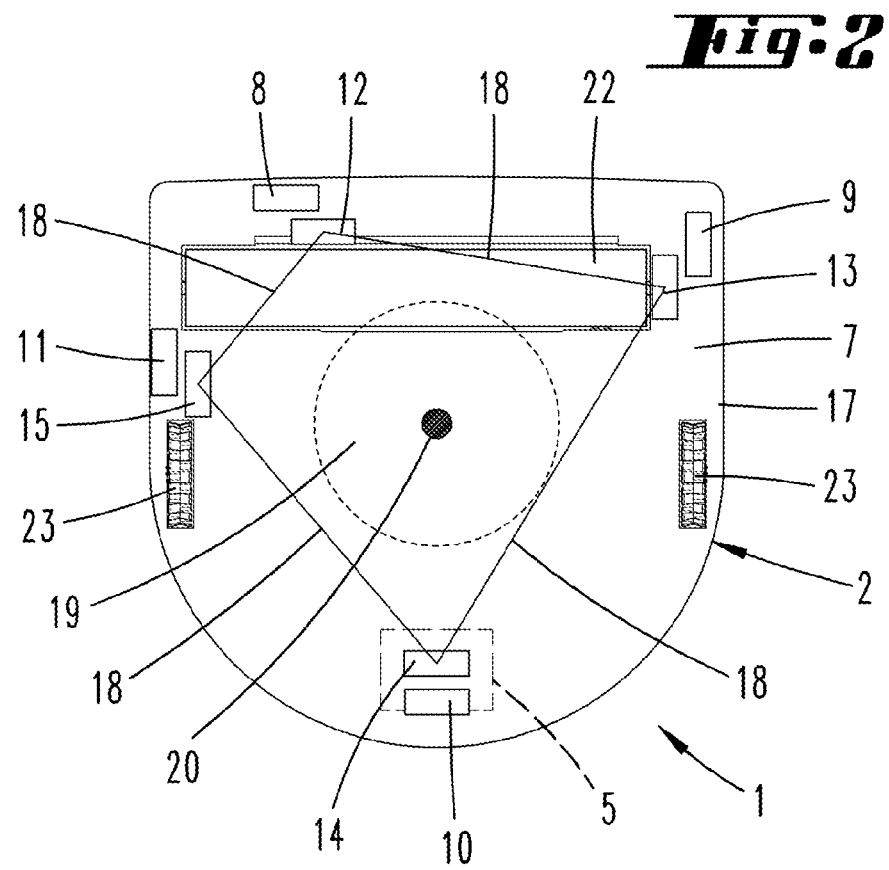
FIG. 2 shows a bottom view of the floor treatment appliance according to FIG. 1.

FIG. 2 shows the underside 7 of the floor treatment appliance 1 comprising the fall sensors 8, 9, 10, 11, 12, 13, 14, 15, which are arranged along the circumferential contour 17 of the appliance housing 2. The fall sensors 8, 9, 10, 11, 12, 13, 14, 15 are arranged in two rows, namely in an outer row, which has four outer fall sensors 8, 9, 10, 11, and an inner row, which includes four inner fall sensors 12, 13, 14, 15. An inner fall sensor 12, 13, 14, 15 is thereby in each case assigned to each outer fall sensor 8, 9, 10, 11, so that sensor pairs form. Here, sensor pairs are formed from the outer fall sensor 8 and the inner fall sensor 12, the outer fall sensor 9 and the inner fall sensor 13, the outer fall sensor 10 and the inner fall sensor 14, as well as the outer fall sensor 11 and the inner fall sensor 15. Each pair of fall sensors 8, 9, 10, 11, 12, 13, 14, 15 is thereby essentially assigned to one side of the circumferential contour 17, in order to secure the floor treatment appliance 1 against slopes 16, which are present in the surrounding area, in four different directions. FIG. 2 furthermore represents a defined center of gravity region 19, which defines a circular region around a projection 20 of the center of mass 21 into the plane of the fall sensors 8, 9, 10, 11, 12, 13, 14, 15, which is formed on the underside 7. When looking at the floor treatment appliance 1 from the bottom or top (in the case of horizontal orientation of the appliance housing 2 and vertical view onto the appliance housing 2), the center of mass 21 and the projection 20 thereof are located one on top of the other The center of gravity region 19 defined around the projection 20 is dimensioned so that straight connecting lines 18 between inner fall sensors 12, 13, 14, 15, which follow one another along the circumferential contour 17, do not touch the circular center of gravity region 19. Here, straight connecting lines 18 are defined between the inner fall sensors 12 and 13, 13 and 14, 14 and 15, as well as 15 and 12, which follow one another. These straight connecting lines 18 evidently do not intersect or touch the center of gravity region 19. The center of gravity region 19 is dimensioned so that no danger of falling at a slope 16 exists for the floor treatment appliance 1, as long as an outer edge of the slope 16 does not yet engage with this center of gravity region 19, i.e., does not yet lie below the center of gravity region 19 in the case of horizontal orientation of the floor treatment appliance 1. Provided that the floor treatment appliance 1 moves further in the direction of the slope 16, however, and the center of gravity region 19 already lies partially over the slope 16, there is a large risk that the floor treatment appliance 1 tilts over the slope 16. The arrangement of the fall sensors 8, 9, 10, 11, 12, 13, 14, 15 on the underside 7 prevents that the floor treatment appliance 1 even moves that far in the direction of the slope 16 and a dangerous situation thus results.

The vicinity of the center of gravity region 19 on the underside 7 of the appliance housing 2 is monitored by means of the fall sensors 8, 9, 10, 11, 12, 13, 14, 15, which span the straight connecting lines 18 around the center of gravity region 19. The second sensor row, which includes the inner fall sensors 12, 13, 14, 15, thereby serves as fail safe for the outer fall sensors 8, 9, 10, 11. For example, the inner fall sensor 12 secures the floor treatment appliance 1 against a fall at a slope 16 during a conventional forward movement of the floor treatment appliance 1, when the assigned outer fall sensor 8 fails, or produces a wrong detection result. The inner fall sensor 13 can likewise replace the outer fall sensor 9. The inner fall sensor 14 therefore forms a redundancy for the outer fall sensor 10, the inner fall sensor 15 can likewise replace the outer fall sensor 11.

Figure 3A:
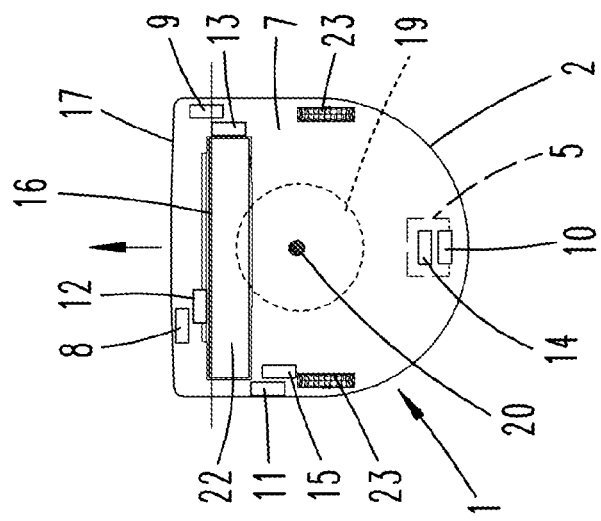
FIG. 3A shows the floor treatment appliance in a bottom view when approaching a slope.
Figure 3B:
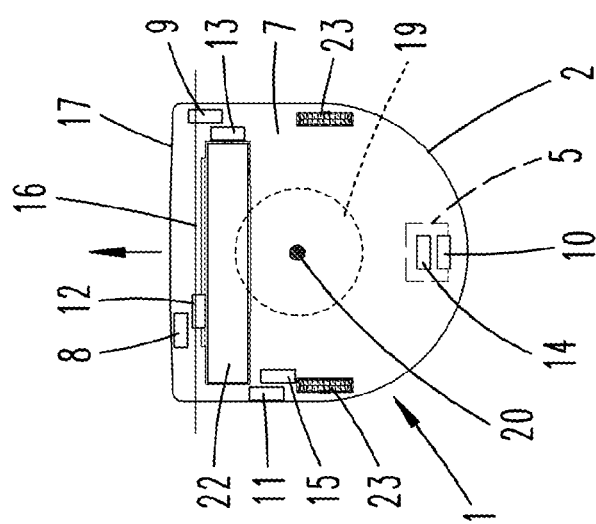
FIG. 3B shows the floor treatment appliance according to FIG. 3A when partially passing over the slope.
Figure 3C:
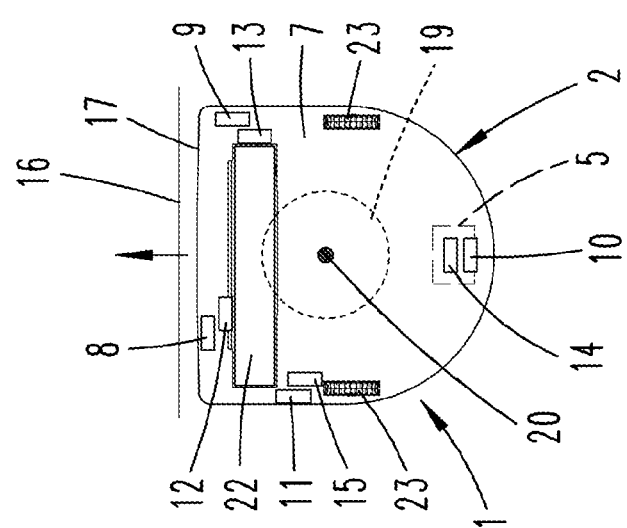
FIG. 3C shows the floor treatment appliance according to FIGS. 3A and 3B when continuing to partially pass over the slope.

The method for checking the functionality of the fall sensors 8, 9, 10, 11, 12, 13, 14, 15 during the ongoing operation of the floor treatment appliance 1 will be described in more detail below. In the course of FIGS. 3A to 3C, the floor treatment appliance 1 moves towards a slope 16. According to FIG. 3A, the appliance housing 2 of the floor treatment appliance 1 is still located completely in front of the slope 16. In FIG. 3B, the appliance housing 2 is already pushed partially over the slope 16, namely so that a subsection of the circumferential contour 17 protrudes beyond the slope 16. In FIG. 3C, the appliance housing 2 is pushed even further beyond the slope 16.

In the situation according to FIG. 3A, none of the fall sensors 8, 9, 10, 11, 12, 13, 14, 15 detects the slope 16 yet. The floor treatment appliance 1 thus initially moves further towards the slope 16, namely in the direction of movement suggested by means of an arrow. As soon as the floor treatment appliance 1 protrudes at least partially with the circumferential contour 17 over the slope 16, the outer edge of the slope 16 ends up in the detection region of the outer fall sensor 8 (FIG. 3B), which leads in the direction of movement. Provided that the fall sensor 8 works without error, the computing means 5 can determine the presence of the slope 16 and can control the drive means 3 of the floor treatment appliance 1 so that the direction of movement is changed, namely away from the slope 16. In the example shown here, it is assumed, however, that the outer fall sensor 8, which is located closest to the circumferential contour 17 of the appliance housing 2 in the driving direction, is defective, and the computing means 5 can thus not recognize that the appliance housing 2 has already pushed partially over the slope 16. Due to the fact that the inner fall sensor 12 assigned to the outer fall sensor 8 is not yet located over the slope 16, said inner fall sensor cannot yet recognize the slope 16. The movement of the floor treatment appliance 1 over the slope 16 is thus continued, until the position shown in FIG. 3C is reached. In the case of this position, the outer edge of the slope 16 is located within the detection region of the inner fall sensor 12, which serves as replacement for the outer fall sensor 8. The computing means 5 recognizes that the appliance housing 2 is already partially located over the slope 16, and stops the drive means 3 of the floor treatment appliance 1 well before the center of gravity region 19 of the appliance housing 2 lies over the slope 16. The floor treatment appliance 1 is thus reliably secured against a fall over the slope 16. In addition to stopping the drive means 3, the computing means 5 furthermore preferably also prompts the output of information to a user of the floor treatment appliance 1, so that said user is informed that an error case has occurred and the floor treatment appliance 1 should be checked.

FIGS. 4 and 5 show further possible embodiments of a floor treatment appliance 1 according to the invention. On the underside 7 of the appliance housing 2, the floor treatment appliance 1 thereby does not have a doubling of fall sensors 8, 9, 10, 11. On the contrary, only a single row of fall sensors 8, 9, 10, 11 is located along the circumferential contour 17. In an exemplary manner, the appliance housing 2 of the floor treatment appliance 1 is formed in a round manner here, whereby the fall sensors 8, 9, 10, 11 are located in angle sections of 90 degrees each along the circumferential contour 17. Based on a conventional direction of movement of the floor treatment appliance 1, in which the fall sensor 8 leads, essentially each side of the floor treatment appliance 1 is secured against a fall by means of one of the fall sensors 8, 9, 10, 11. In the case of this exemplary embodiment, the floor treatment appliance 1 can also be any floor treatment appliance 1. Here, said floor treatment appliance is once again equipped with a cleaning element 22 and has wheels 23 for automatically moving the floor treatment appliance 1 over a surface 6. The fall sensors 8, 9, 10, 11 are formed—as in the case of the first-mentioned embodiment according to FIGS. 1 to 3—to measure a distance a to the surface 6. The fall sensors 8, 9, 10, 11 can be formed as optical or acoustic sensors, for example as laser sensors or ultrasonic sensors. A distance measurement can furthermore also take place by means of a radar sensor system. The computing means 5 of the floor treatment appliance is formed to check the functionality of each of the fall sensors 8, 9, 10, 11, in that a signal of the fall sensor 8, 9, 10, 11, which is to be checked, is compared with the signals of at least one of the two respectively following fall sensors 8, 9, 10, 11—depending on the direction of movement of the floor treatment appliance 1. When the floor treatment appliance 1 moves in the main direction of movement, for example, in the case of which the fall sensor 8 leads, the detection signal of the fall sensor 8 is compared with the signals of the two fall sensors 9 and 11, which trail in the direction of movement. An imaginary straight connecting line between the trailing fall sensors 9 and 11 is thereby oriented essentially orthogonally to the direction of movement of the floor treatment appliance 1, so that it can be assumed that the trailing fall sensors 9 and 11 will detect a slope 16 essentially at the same time when the outer edge thereof likewise runs orthogonally to the direction of movement of the floor treatment appliance 1. When the leading fall sensor 8 is functional in the usual way, the latter will detect the slope 16 first. Based on the distance a measured by the fall sensor 8, the computing unit 5 recognizes that the appliance housing 2 is already located partially over the slope 16, and controls the drive means 3 of the wheels 23 so that the floor treatment appliance 1 turns or moves away to the side, respectively, prior to reaching the slope 16. When the fall sensor 8 is defective, however, it may happen that the latter outputs a wrong or no detection signal at all, and the floor treatment appliance 1 thus continues to move towards the slope 16. In the case of the continued movement, the two trailing fall sensors 9 and 11 then get over the slope 16. The computing means 5 of the floor treatment appliance 1 recognizes that the fall sensor 8 has not detected the slope 16 before, and draws the conclusion that the fall sensor 8 must be defective. The drive means 3 of the floor treatment appliance 1 is then preferably stopped as emergency shutdown. In addition, the error of the fall sensor 8 is preferably brought to the attention of a user of the floor treatment appliance 1. Even though the mode of operation is illustrated here on the basis of a floor treatment appliance 1 comprising only four fall sensors 8, 9, 10, 11, it is suggested to arrange additional fall sensors 8, 9, 10, 11 on the underside 7 of the appliance housing 2, in particular so that the first pair of trailing fall sensors 9, 11 lies in front of a carrying element of the appliance housing 2, i.e. for example in front of the cleaning element 22, which supports the floor treatment appliance 1 on the surface 6. It is prevented thereby that the floor treatment appliance 1 can tilt over a slope 16, before the following fall sensors 9, 11 can compensate the error of the leading fall sensor 8. The securing function of the floor treatment appliance 1 works generally in any direction of movement of the floor treatment appliance 1, provided that the drive means 3 allows for such a movement, and fall sensors 8, 9, 10, 11 are accordingly arranged on the underside 7 of the appliance housing 2, which allow for the above-described mode of operation in each direction of movement of the floor treatment appliance 1. Provided that the floor treatment appliance 1 moves in a direction, for example, in which the fall sensor 10 leads, the fall sensors 9 and 11 likewise serve as comparative sensors again, which provide a detection result for comparison with the detection result of the leading fall sensor 10.

Lastly, FIG. 5 shows a possible embodiment of a system according to the invention of an automatically moving floor treatment appliance 1 and a base station 24. Here, the base station 24 is formed, for example, as charging station for an accumulator (not illustrated) of the floor treatment appliance 1. The floor treatment appliance 1 as well as the base station 24 have a charging interface 27, which provides for a transfer of electrical energy. However, the invention is not tied to a formation of the base station 24 as charging station. In the alternative or in addition, the base station 24 can also be configured to provide other service activities for the floor treatment appliance 1. The base station 24 has a housing comprising a surface 6 for being traveled on by the floor treatment appliance 1. So that the floor treatment appliance 1 can get onto the surface 6 of the base station 24, the latter has a ramp 28. A reference surface 25, which has a slope 16 with a defined distance a, which is known to the computing means 5 of the floor treatment appliance 1, to a lower-lying plane, is formed on the surface 6. The slope 16 forms a type of "measuring gap", over which a subregion of the underside 7 of the appliance housing 2 of the floor treatment appliance 1 slides, when the charging interfaces 27 of base station 24 and floor treatment appliance 1 are connected to one another for the energy transfer. In this "docking position," the fall sensor 8, which leads here, for example, detects the distance a and compares it with the reference value of distance a, which is known to the computing means 5. Provided that both amounts of the distance a correspond, the computing means 5 of the floor treatment appliance 1 determines that the fall sensor 8 works correctly. If, in contrast, the fall sensor 8 detect a distance a, which deviates from the reference value, the computing means 5 can draw a conclusion to an error of the fall sensor 8. A user can then be given an indication via a communication interface of the floor treatment appliance 1 that the floor treatment appliance 1 should be checked by an expert. The indication can also be transmitted to an external end device of the user by means of wireless communication.

It can furthermore also be provided that the reference surface 25 of the base station 24 is formed so that the proper functioning of several fall sensors 8, 9, 10, 11, 12, 13, 14, 15 can be checked at the same time. The reference surface 25 is thereby intersected, for example, so that subregions of the appliance housing 2 having several fall sensors 8, 9, 10, 11, 12, 13, 14, 15 protrude beyond a slope 16 at the same time and can detect a distance a, which, in turn, is then compared with one or several reference values by the computing means 5 of the floor treatment appliance 1. For example, the reference surface 25 illustrated in FIG. 5 can be so narrow that the wheels 23, which are parallel to one another, still stand securely thereon, while subregions of the appliance housing 2 located next to it, in each case protrude over a slope 16.

A further option for checking the proper functioning of the fall sensors 8, 9, 10, 11, 12, 13, 14, 15 is to compare the amounts of the distance a, which are detected chronologically successively by the fall sensor 8, 9, 10, 11, 12, 13, 14, 15, to one another during a movement of the floor treatment appliance 1. Even in the case of a flat surface 6, a fluctuation of the detection signal occurs due to signal noise during the movement of the floor treatment appliance 1. When the fall sensor 8, 9, 10, 11, 12, 13, 14, 15, which is to be checked, is defective, such a fluctuation of the detection value cannot be observed. This additional checking measure can be applied in the case of all above-described embodiments of the floor treatment appliance 1, i.e., in the case of the embodiment according to FIGS. 1 to 3, in the case of the embodiment according to FIG. 4, and also in the case of the embodiment according to FIG. 5. The embodiments can furthermore also be combined with one another, in order to check the functionality of the fall sensors 8, 9, 10, 11, 12, 13, 14, 15 repeatedly and to verify it in different ways.

Although only a few embodiments of the present invention have been shown and described, it is to be understood that many changes and modifications may be made thereunto without departing from the spirit and scope of the invention.

LIST OF REFERENCE NUMERALS 1 floor treatment appliance
2 appliance housing
3 drive means
4 detection means
5 computing means
6 surface
7 underside
8 fall sensor
9 fall sensor
10 fall sensor
11 fall sensor
12 fall sensor
13 fall sensor
14 fall sensor
15 fall sensor
16 slope
17 circumferential contour
18 straight connecting line
19 center of gravity region
20 projection
21 center of mass
22 cleaning element
23 wheel
24 base station
25 reference surface
26 collision sensor
27 charging interface
28 ramp
a distance

What is claimed is:
1. An automatically moving floor treatment appliance (1) comprising:
an appliance housing (2),
a drive (3) configured for moving the floor treatment appliance (1) within a surrounding area,
a plurality of fall sensors (8, 9, 10, 11, 12, 13, 14, 15) arranged on an underside (7) of the appliance housing (2) facing a surface (6), the plurality of fall sensors being configured to detect a distance (a) of the floor treatment appliance (1) from the surface (6), and
a computing means (5), which is configured to compare the distance (a) detected by the fall sensors (8, 9, 10, 11, 12, 13, 14, 15) with a threshold value defining a slope (16) and, in the event that the detected distance (a) is greater than the defined threshold value, to determine the presence of a slope (16) as a detection result, and to transmit a control command for changing a movement of the floor treatment appliance (1) to the drive means (3),
wherein, the plurality of fall sensors (8, 9, 10, 11, 12, 13, 14, 15) are arranged one behind the other in a direction of a circumferential contour (17) of the underside (7),
wherein the computing means (5) is configured to compare a detection result of one of the fall sensors (8, 9, 10, 11, 12, 13, 14, 15) with a known reference result, and, in the event that the detection result does not correspond with the reference result, to determine a malfunctioning of a leading one of the fall sensors (8, 9, 10, 11, 12, 13, 14, 15), wherein the computing means (5) is configured to compare distances (a) detected chronologically successively by the same fall sensor (12, 13, 14, 15) during a movement of the floor treatment appliance (1) with one another, and, when the distances (a) are identical, to determine a malfunctioning of the same fall sensor (12, 13, 14, 15), and/or wherein the computing means (5) is configured to compare a detection result of the leading fall sensor (8, 9, 10, 11, 12, 13, 14, 15) with a detection result of at least another one of the fall sensors (8, 9, 10, 11, 12, 13, 14, 15) trailing the leading fall sensor (8, 9, 10, 11, 12, 13, 14, 15) in the direction of movement, and when the trailing fall sensor (8, 9, 10, 11, 12, 13, 14, 15) detects a slope (16) without the leading fall sensor (8, 9, 10, 11, 12, 13, 14, 15) having detected the slope (16) before, to determine a malfunctioning of the leading fall sensor (8, 9, 10, 11, 12, 13, 14, 15), and wherein the floor treatment appliance (1) is initially further operated under a condition that the trailing fall sensor (8, 9, 10, 11, 12, 13, 14, 15) now takes over a securing function of the malfunctioning leading fall sensor (8, 9, 10, 11, 12, 13, 14, 15).

2. The floor treatment appliance (1) according to claim 1, wherein the plurality of fall sensors comprise at least four fall sensors (8, 9, 10, 11, 12, 13, 14, 15), which, based on a geometrical center of the underside (7), are located opposite one another essentially in pairs, so that at least one of the fall sensors (8, 9, 10, 11, 12, 13, 14, 15) is assigned to each one of four sides of the circumferential contour (17).

3. The floor treatment appliance (1) according to claim 1, wherein the plurality of fall sensors comprise a plurality of outer fall sensors (8, 9, 10, 11), which are arranged one behind the other in the direction of a circumferential contour (17) of the underside (7), and a plurality of inner fall sensors (12, 13, 14, 15), which, based on the circumferential contour (17) and relative to the outer fall sensors (8, 9, 10, 11), are offset inwards, wherein the computing means (5) is configured to compare a detection result of one of the outer fall sensors (8, 9, 10, 11) with a detection result of an assigned one of the inner fall sensors (12, 13, 14, 15), and, in the event that the assigned inner fall sensor (12, 13, 14, 15) detects a slope (16) and the assigned outer fall sensor (8, 9, 10, 11) does not detect a slope (16), to determine a malfunctioning of the assigned outer fall sensor (8, 9, 10, 11).

4. The floor treatment appliance (1) according to claim 3, wherein based on a position on the underside (7) of the appliance housing (2), each one of the inner fall sensors (12, 13, 14, 15) is spatially assigned to one of the outer fall sensors (8, 9, 10, 11), so that each outer fall sensor (8, 9, 10, 11) and the assigned inner fall sensor (12, 13, 14, 15) form a sensor pair.

5. The floor treatment appliance (1) according to claim 3, wherein the inner fall sensors (12, 13, 14, 15) are arranged on the underside (7) of the appliance housing (2) so that a straight connecting line (18) between two of the inner fall sensors (12, 13, 14, 15), which are adjacent in the circumferential direction of the circumferential contour (17), does not intersect and does not affect a center of gravity region (19) defined on the underside (7), which has a vertical projection (20) of a center of mass (21) of the floor treatment appliance (1) into a plane of the fall sensors (8, 9, 10, 11, 12, 13, 14, 15).

6. The floor treatment appliance (1) according to claim 1, wherein the computing means (5) is configured to stop the movement of the floor treatment appliance (1) and/or to transmit an error signal to a user of the floor treatment appliance (1) when a malfunctioning of one of the fall sensors (8, 9, 10, 11, 12, 13, 14, 15) is determined.

7. A system of an automatically moving floor treatment appliance (1) according to claim 1, and a base station (24) for performing a service activity at the floor treatment appliance (1), wherein the base station (24) has a reference surface (25), on which the floor treatment appliance (1) can travel, wherein the computing means (5) of the floor treatment appliance (1) is configured to compare a distance (a) from the reference surface (25) detected by one of the fall sensors (8, 9, 10, 11, 12, 13, 14, 15) of the floor treatment appliance (1) with a defined reference result, and, in the event of a deviation, to determine a malfunctioning of the one fall sensor (8, 9, 10, 11, 12, 13, 14, 15).

8. The system according to claim 7, wherein the reference surface (25) has a slope (16), wherein the slope (16) is positioned so that at least one of the fall sensors (8, 9, 10, 11, 12, 13, 14, 15) of the floor treatment appliance (1) displaces beyond the slope (16) when traveling onto the reference surface (25).

9. A method for checking the functionality of a fall sensor (8, 9, 10, 11, 12, 13, 14, 15) of an automatically moving floor treatment appliance (1), wherein the floor treatment appliance (1) has an appliance housing (2), a drive (3) for the movement of the floor treatment appliance (1) within a surrounding area, a plurality of fall sensors (8, 9, 10, 11, 12, 13, 14, 15) arranged on an underside (7) of the appliance housing (2) facing a surface (6) and arranged one behind the other in the direction of a circumferential contour (17) of the underside (7), and a computing means (5), comprising the steps of:

detecting with the fall sensor (8, 9, 10, 11, 12, 13, 14, 15) a distance (a) of the floor treatment appliance (1) from the surface (6), comparing with the computing means (5) the distance (a) detected by the fall sensor (8, 9, 10, 11, 12, 13, 14, 15) with a threshold value defining a slope (16) and, when the distance (a) is greater than the defined threshold value, determining the presence of a slope (16) as a detection result, transmitting with the computing means a control command for changing a movement of the floor treatment appliance (1) to the drive means (3), wherein the computing means (5) compares a detection result of a fall sensor (8, 9, 10, 11, 12, 13, 14, 15) with a defined reference result, and when the detection result does not correspond with the reference result, determines a malfunctioning of a leading one of the fall sensors (8, 9, 10, 11, 12, 13, 14, 15), wherein the computing means (5) compares distances (a) detected chronologically successively by the same fall sensor (12, 13, 14, 15) during a movement of the floor treatment appliance (1) with one another, and when the distances (a) are identical, determines a malfunctioning of the same fall sensor (12, 13, 14, 15), and/or wherein the computing means (5) compares a detection result of the leading fall sensor (8, 9, 10, 11, 12, 13, 14, 15) with a detection result of at least one trailing fall sensor (8, 9, 10, 11, 12, 13, 14, 15) in the direction of movement, and when the at least one trailing fall sensor (8, 9, 10, 11, 12, 13, 14, 15) detects a slope (16) without the leading fall sensor (8, 9, 10, 11, 12, 13, 14, 15) having detected the slope (16) before, determines a malfunctioning of the leading fall sensor (8, 9, 10, 11, 12, 13, 14, 15), and wherein the floor treatment appliance (1) is initially further operated under a condition that one of the at least one trailing fall sensor (8, 9, 10, 11, 12, 13, 14, 15) now takes over the securing function of the malfunctioning leading fall sensor (8, 9, 10, 11, 12, 13, 14, 15).

\* \* \* \* \*